United States Patent [19]

Matsumoto et al.

[11] Patent Number: 4,559,544

[45] Date of Patent: Dec. 17, 1985

[54] MULTI-NOZZLE HEAD FOR INK ON-DEMAND TYPE INK JET PRINTER

[75] Inventors: Shuzo Matsumoto, Yokohama; Takuro Isayama; Hiroshi Yamazaki, both of Tokyo; Yasuo Katano, Yokohama, all of Japan

[73] Assignee: Ricoh Company, Ltd., Tokyo, Japan

[21] Appl. No.: 599,418

[22] Filed: Apr. 12, 1984

[30] Foreign Application Priority Data

| | | | |
|---|---|---|---|
| Apr. 14, 1983 | [JP] | Japan | 58-56017 |
| Apr. 14, 1983 | [JP] | Japan | 58-56018 |
| Apr. 20, 1983 | [JP] | Japan | 58-69358 |
| Apr. 20, 1983 | [JP] | Japan | 58-69357 |

[51] Int. Cl.[4] .................... G01D 15/16

[52] U.S. Cl. .................... 346/140 R; 346/75

[58] Field of Search .................... 346/140, 75

[56] References Cited

U.S. PATENT DOCUMENTS

| | | | |
|---|---|---|---|
| 3,747,120 | 7/1973 | Stemme | 346/140 X |
| 4,095,237 | 6/1978 | Amberntsson | 346/140 |
| 4,312,008 | 1/1982 | Taub | 346/140 |
| 4,434,430 | 2/1984 | Koto | 346/140 |

*Primary Examiner*—Joseph W. Hartary
*Attorney, Agent, or Firm*—David G. Alexander

[57] ABSTRACT

A unique arrangement of a multi-nozzle head which is suitable for use with an ink on-demand type ink jet printer. A flat head base is formed with a plurality of nozzles and ink compressing chambers associated therewith by etching. The ink compressing chambers are divided into a plurality of groups which are positioned on imaginary lines, which are individually inclined a predetermined angle with respect to an intended direction of ink ejection.

15 Claims, 11 Drawing Figures

MULTI-NOZZLE HEAD FOR INK ON-DEMAND TYPE INK JET PRINTER

BACKGROUND OF THE INVENTION

The present invention relates to a head for use in an ink jet printer and, more particularly, to a unique arrangement of a multi-nozzle head feasible for a so-called ink on-demand type ink jet printer in which ink compressing chambers constituting the head and electrostrictive vibrators in an information signal supply section also constituting the head are individually arranged in such a manner as to promote integration of the head.

Ink on-demand type ink jet printers have been extensively used due to their simple and, therefore, potentially small-size and economical construction, compared to charge control type and other various types of ink jet printers. Such a type of printer, in view of its inherently low drive frequency, is furnished with a multi-head configuration, or multi-nozzle configuration, in order to print out information at a high speed and with a high resolution. In a prior art ink jet printer of the type concerned, an electrostrictive vibrator forming essential part of an information signal supply section of a head is usually directly fit on a wall of an ink compressing chamber. Therefore, for a multi-head or multi-nozzle (integrated) configuration, it is a prerequisite that the ink compressing chambers be individually dimensioned as small as possible to enhance the degree of integration. However, because each electrostrictive vibrator is fixedly retained by a wall of its associated ink compressing chamber substantially along its entire circumference, decreasing the chamber dimensions renders the vibrator difficult to vibrate and, thereby, disenables the chamber to vary its volume by an amount which is necessary for ejection of ink drops. For this reason, the ink compressing chambers cannot be designed small beyond a certain limit to make the integration of heads quite difficult.

To solve this problem, elaborated arrangements of a plurality of ink compressing chambers have been proposed such as one in which the ink compressing chambers are shifted in position from each other, that is, they are arranged not in a direction perpendicular to a direction of ink drop ejection but with a given inclination. However, because the ink compressing chambers cannot be formed in a small size for the reason described above, such an implementation is impractical unless the ink passageway extending from each chamber to its associated nozzle is made longer. This would result in a bulky head construction and not in the desired integration.

In light of this, Takuro Isayama who is one of the inventors of the present invention has already proposed in U.S. patent application Ser. No. 481,066, filed Mar. 31, 1983 and West German patent application No. P 33 11 956.2, filed Mar. 31, 1983 a multi-nozzle head for an ink on-demand type ink jet printer which is unique in construction in that a signal supply section thereof has a cantilevered structure for the integration of a head.

The present invention constitutes an improvement over the multi-nozzle head with a cantilevered signal supply section proposed in the prior application for use in an ink on-demand type ink jet printer.

SUMMARY OF THE INVENTION

It is therefore an object of the present invention to provide an improved multi-nozzle head suitable for an ink on-demand type ink jet printer in which an information signal supply section having an electrostrictive vibrator is cantilevered.

It is another object of the present invention to provide an improved multi-nozzle head suitable for an ink on-demand type ink jet printer in which a plurality of electrostrictive vibrators in an information signal supply section constituting the head and a plurality of ink compressing chambers formed in an ink ejecting section also constituting the head are arranged in a unique fahion to promote integration of the head.

It is another object of the present invention to provide an improved multi-nozzle head suitable for an ink on-demand type ink jet printer which is capable of removing bubbles from ink compressing chamber.

It is another object of the present invention to provide an improved, easy-to-produce and cost-effective multi-nozzle head for an ink on-demand type ink jet printer in which an information signal supply section having an electrostrictive vibrator is cantilevered.

It is another object of the present invention to provide a generally improved multi-nozzle head suitable for an ink on-demand type ink jet printer.

In a multi-nozzle head for an ink jet printer having a signal supply section for generating displacements which correspond to information signals to be printed out, and an ink ejecting section for ejecting ink drops from a predetermined number of nozzles in response to the displacements, the ink ejecting section in accordance with the present invention comprises a flat head base, and ink compressing chambers in the predetermined number which are formed in the head base to supply ink to the nozzles respectively, the ink compressing chambers being arranged such that the ink compressing chambers are divided into a plurality of groups and the groups are respectively positioned on a plurality of imaginary lines which are inclined a predetermined angle with respect to an intended direction of ink drop ejection from the nozzles.

The above and other objects, features and advantages of the present invention will become apparent from the following detailed description taken with the accompanying drawing.

DESCRIPTION OF THE PREFERRED EMBODIMENTS

While the multi-nozzle head for an ink on-demand type ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
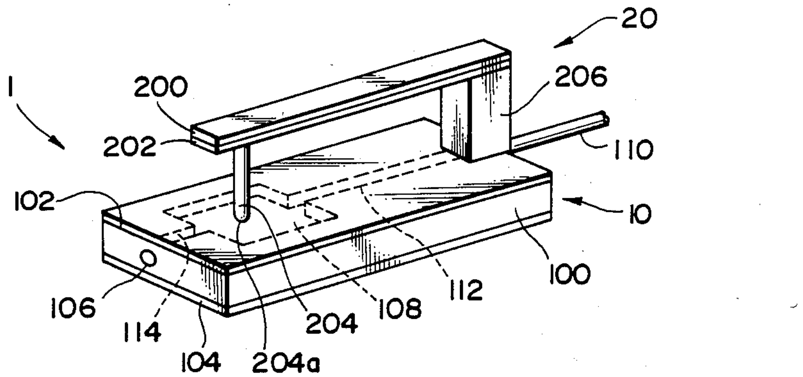
FIG. 1 PRIOR ART
FIGS. 1–3 are views of prior art head arrangements for an ink on-demand type ink jet printer to which the present invention is applicable.

To facilitate understanding of the present invention, a brief reference will be made to a head having a cantilevered information signal supply section proposed in the previously mentioned prior application, shown in FIGS. 1-3. FIG. 1 is a perspective view of a head with a single nozzle which illustrates a basic construction and function of the head, FIG. 2 a perspective view of a head with multiple nozzles, and FIG. 3 a partly taken away enlarged perspective view of a multi-nozzle head.

As shown in FIG. 1, the head, generally 1, comprises an ink ejecting section 10 and an information signal supply section 20. The ink ejecting section 10 is made up of a relatively thick, flat head base 100, and a pair of relatively thin, flat and resilient vibrators 102 and 104 which are respectively fit on opposite surfaces of the head base 100. The information signal supply section 20, on the other hand, is comprised of an electrostrictive vibrator 200 which vibrates in response to an information signal to be printed out, a resilient vibration plate 202 integrally bonded to the vibrator 200, a vibration transmitting rod 204 extending from one end portion of the plate 202, and a support member, or post, 206 extending from the other end portion of the plate 202. By an etching process, the head base 100 is formed with a nozzle 106, an ink compressing chamber 108, an ink supply passageway 112 for guiding ink from an ink supply tube 110 to the chamber 108, and an ink delivery passageway 114 for feeding out the ink from the chamber 108 to the nozzle 206. In the information signal supply section 20, the tip 204*a* of the vibration transmitting rod 204 is located above the chamber 108 of the ink ejecting section 108 and held in pressing contact with the resilient plate 102.

When the vibrator 200 is supplied with a signal voltage representative of information to be printed out from a drive circuit (not shown), it is caused to move up or down fulcrumed by the support member 206. The displacement of the vibrator 200 is transmitted by the rod 204 to the vibration plate 102, which forms part of the walls of the chamber 108. As a result, the plate 102 is deformed by the displacement of the vibrator 200, or the plate 202 integral therewith, changing the volume of the chamber 108. The fluid pressure inside the chamber 108 is elevated in response to a decrease in the volume of the chamber 108, thereby ejecting an ink drop from the nozzle 106.

Figure 2:
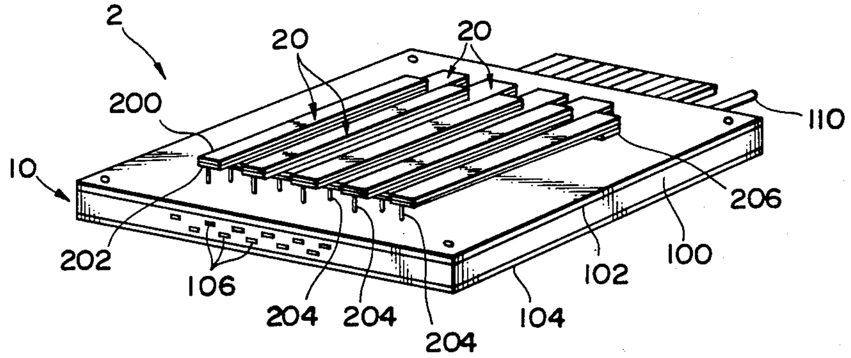
FIG. 2 PRIOR ART
Figure 3:
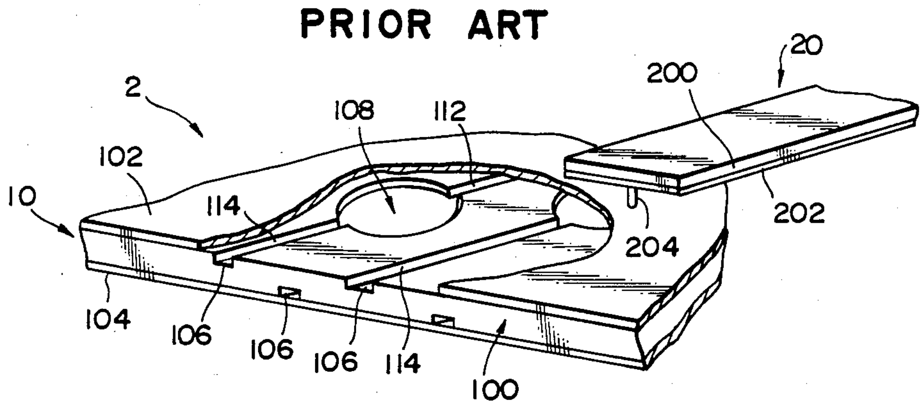
FIG. 3 PRIOR ART

In FIGS. 2 and 3, a multi-nozzle head 2 is shown which comprises a plurality of heads arranged in an integrated configuration, each of the heads being of the type shown in FIG. 1. In the multi-nozzle head 2, the elctrostrictive vibrators 200 constituting the information signal supply sections 20 are arranged and supported in a common orientation with respect to a group of the ink compressing chambers 108, which constitute the ink ejecting section 10. This imposes a limitation on the arrangement of the chambers 108 which is objectionable in designing the head base 100 small-size.

Further, once bubbles are inroduced into such a chamber 108, they prevent the compression force exerted by the vibrator 200 from being duely transmitted to the ink in the chamber 108 so that the ejection velocity of ink from the nozzle 106 becomes irregular to lower the printing quality.

Hereinafter will be described a multi-head nozzle embodying the present invention which is free from the problems discussed above.

Figure 4:
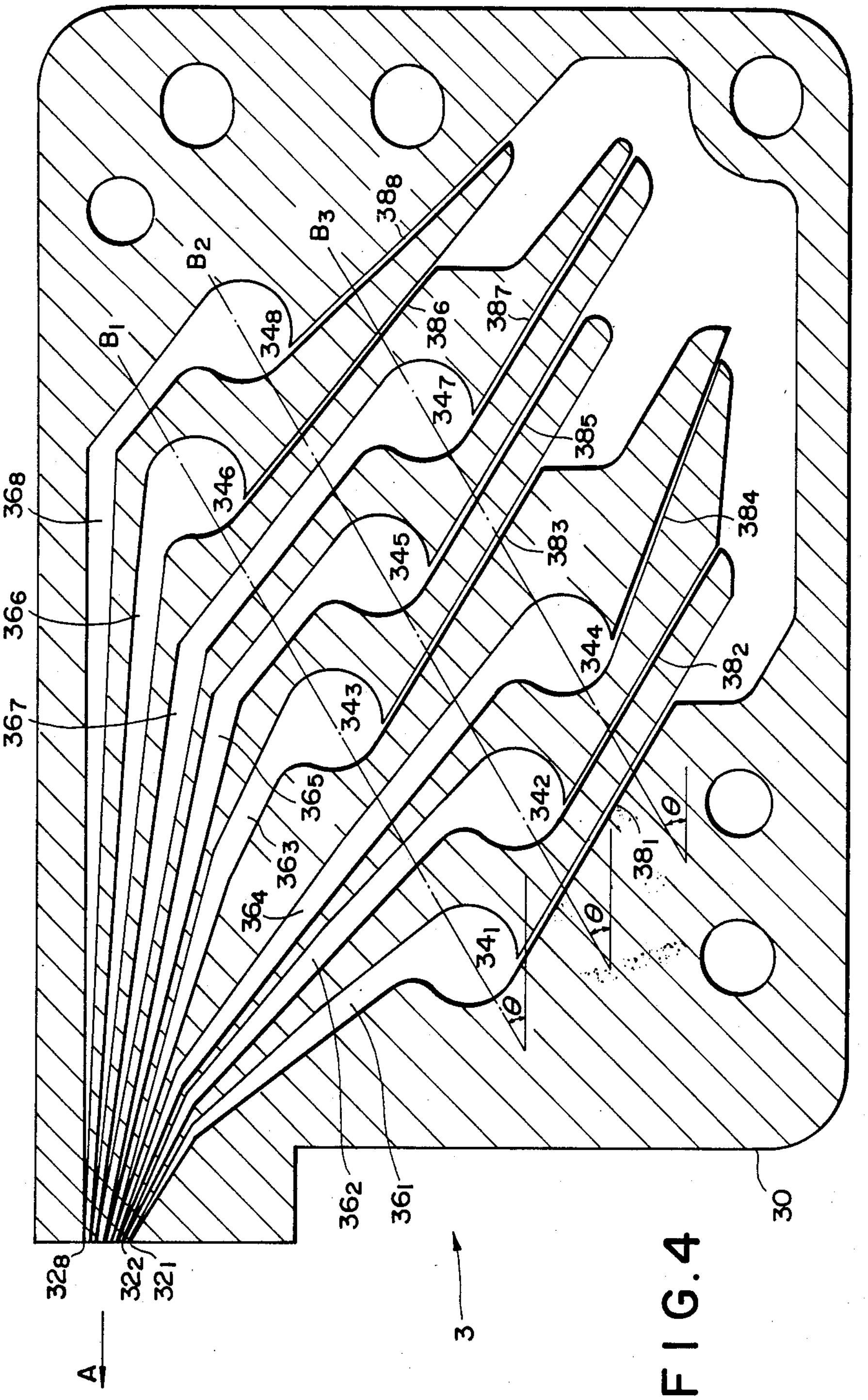
FIG. 4 is a view of an arrangement of a plurality of nozzles, ink compressing chambers, ink delivery passageways and ink supply passageways which are formed in a head base of a multi-nozzle head embodying the present invention.

Referring to FIG. 4, the multi-nozzle head of the present invention is shown and generally designated by the reference numeral 3. Although the embodiment employs eight nozzles $32_1$–$32_8$, such is not limitative and only illustrative. As shown, a head base 30 which forms an ink ejecting section of the head 3 is formed by etching with eight nozzles $32_1$–$32_8$, eight ink compressing chambers $34_1$–$34_8$, ink delivery passageways $36_1$–$36_8$ for respectively delivering ink from the chambers $34_1$–$34_8$ to the nozzles $32_1$–$32_8$, and ink supply passageways $38_1$–$38_8$ for respectively supplying ink to the chambers $34_1$–$34_8$. The chambers $34_1$–$34_8$ are arranged on imaginary lines $B_1$, $B_2$ and $B_3$ which are individually inclined a predetermined angle $\theta$ with respect to an intended direction of ink ejection A. Assuming that the angle $\theta$ is zero, the imaginary lines $B_1$–$B_3$ overlaps in a single line and the chambers $34_1$–$34_8$ is located on the single line, thereby making the head 3 extremely long. This, coupled with the fact that the head 3 needs a certain height to accommodate the electrostrictive vibrators associated with the chambers $34_1$–$34_8$ and oriented to extend vertically in the drawing, would prevent the dimensions of the head 3 from being cut down. Assuming that the angle $\theta$ is 90 degrees, on the other hand, the layout of the electrostrictive vibrators falls in difficulty and, thereby, renders the production difficult. It will be noted that the vertical direction in the drawing coincides with the vertical direction of the head during printing operation.

Elaborated with the above in view, the illustrative embodiment of the present invention arranges the ink compressing chambers $34_1$–$34_8$ on the plurality of lines $B_1$–$B_3$ which are individually inclined an angle $\theta$ with respect to the ink ejecting direction A. Such an arrangement of the chambers $34_1$–$34_8$ effectively reduces the space required for the chambers both in the vertical direction and in the widthwise direction. Especially, it reduces the required space in the vertical direction and, thereby, the inclination of the ink delivery passageways $36_1$–$36_8$ which extend from their associated chambers $34_1$–$34_8$ to the nozzles $32_1$–$32_8$, so that it becomes easier to set up a horizontal ink ejecting direction A.

Another advanage attainable with the illustrative embodiment is that, because the ink compressing chambers $34_1$–$34_8$ are located below their corresponding nozzles $32_1$–$32_8$, bubbles admitted thereinto will gradually move toward the nozzles due to buoyancy and will soon be discharged from the nozzles.

Figure 5:
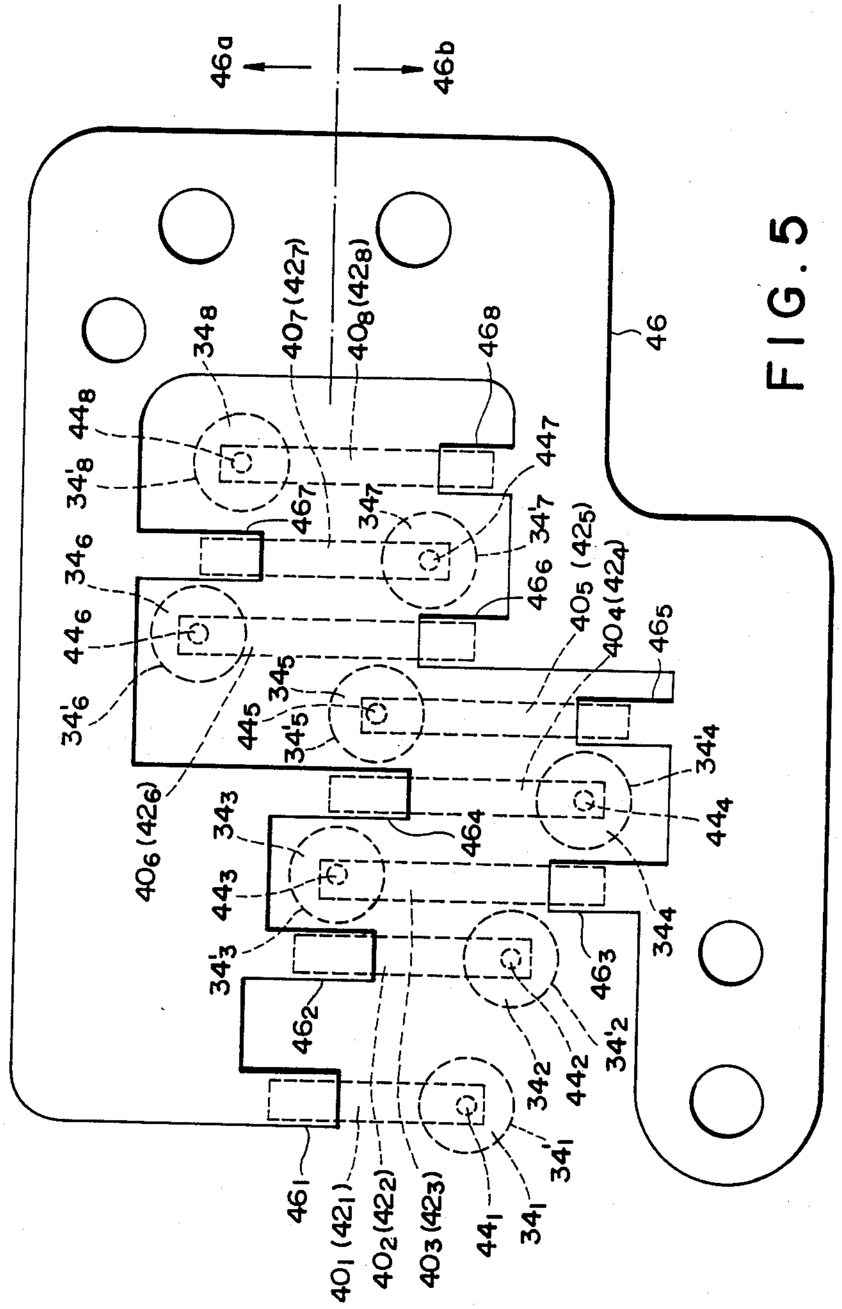
FIG. 5 is a view of an example of a support member applicable to the arrangement shown in FIG. 4.

Referring to FIG. 5, a preferred example of a support plate 46 is shown which is adapted to support the information signal supply sections shown in FIGS. 1-3 and made up of electrostrictive vibrators $40_1$–$40_8$ and resilient vibration plates $42_1$–$42_8$ which are respectively integral with the vibrators $40_1$–$40_8$ and formed vibration transmitting rods $44_1$–$44_8$ at their ends. As shown, the support member 46 is provided with mounting portions $46_1$–$46_8$ which carry respectively the vibrators $40_1$–$40_8$ and vibration plates $42_1$–$42_8$ which are associated with the chambers $34_1$–$34_8$.

It will be seen from the drawing that the support plate 46 with the illustrated configuration allows all the vibrators $40_1$–$40_8$ and vibration plates $42_1$–$42_8$ to have a substantially identical length and be arranged in such a manner as to overlap each other in the vertical direction, resulting in a shorter vertical length of the head.

Additionally, such a configuration cuts down the widthwise dimension as well. While the support member 46 is shown as comprising a single member, it will readily be understood that such is only illustrative and the support member may comprise an assembly of two members 46*a* and 46*b*.

Figure 6A:
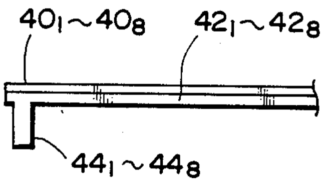
FIGS. 6A, 6B, 7A and 7B are views of examples of a vibration transmitting rod included in the multi-nozzle head in accordance with the present invention.
Figure 6B:
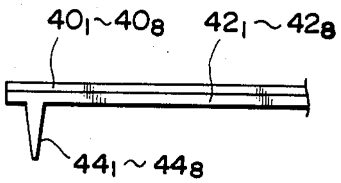

Referring to FIGS. 6A and 6B, practical examples of the vibration transmitting rods $44_1$–$44_8$ constituting the information signal supply sections are shown. Each of the rods $44_1$–$44_8$ is formed as a projection extending from one end of its associated vibration plate $42_1$–$42_8$, which is integral with the vibrator $40_1$–$40_8$. The projection 44 may be formed by a suitable process such as electroforming or punching (forming a projection by mechanical impact force). Typically, a material available for the projection 44 is nickel or the like in the case of electroforming and stainless steel, nickel, phosphor bronze or the like in the case of punching. Meanwhile, resilient vibration plates or diaphragms $34'_1$–$34'_8$ (see FIGS. 5 and 7A and 7B) respectively urged by the tips of the rods $44_1$–$44_8$ in contact therewith and forming part of the chambers $34_1$–$34_8$ are individually shaped as thin plates (20–50 microns) and should be caused to displace in unison with the displacement of the associated rods $44_1$–$44_8$. Therefore, they are made of a material which exhibits flexibility when formed as a thin plate. Each of the vibration transmitting rods $44_1$–$44_8$ is prism-shaped (FIG. 6A) or pyramid-shaped (FIG. 6B), for example, and higher in rigidity than the vibration plates $34'_1$–$34'_8$ which serve as part of the walls of their associated ink compressing chambers $34_1$–$34_8$.

If desired, the projections $44_1$–$44_8$ may be formed by bending the vibration plates $42_1$–$42_8$ or projection-shaped vibration transmitting rods $44_1$–$44_8$ may be welded or otherwise securely connected to the vibration plates $42_1$–$42_8$.

Figure 7A:
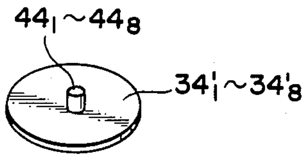
Figure 7B:
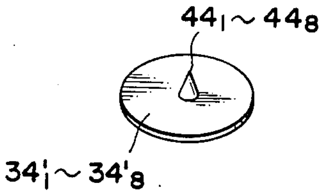
Figure 8A:
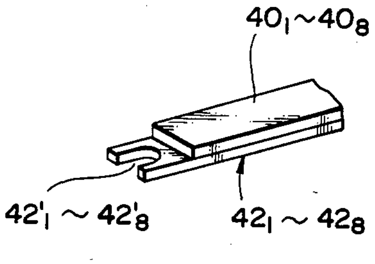
FIGS. 8A and 8B are views of examples of a vibration plate which has a free end portion engagable with the rod shown in FIG. 7A or 7B and connected to an electrostrictive vibrator.
Figure 8B:
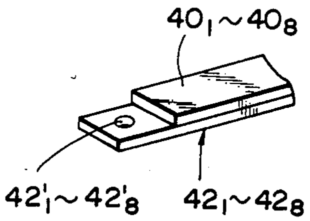

Meanwhile, the vibration transmitting rods $44_1$–$44_8$ may be respectively formed integrally with the vibration plates $34'_1$–$34'_8$ which define part of the chambers $34_1$–$34_8$ as shown in FIGS. 7A and 7B, instead of being formed integrally with one end of the vibration plates $42_1$–$42_8$. In such a case, recesses or through openings, commonly designated by the reference numerals $42'_1$–$42'_8$ in FIG. 8A or 8B, are formed in the free end portions of the vibration plates $42_1$–$42_8$ which are integral with the vibrators $40_1$–$40_8$. The recesses or through openings $42'_1$–$42'_8$ are respectively engaged by the free end portions of the vibration transmitting rods $44_1$–$44_8$ on the vibration plates $34'_1$–$34'_8$. Such an alternative configuration effectively absorbs any dimensional error along the height of the rods $44_1$–$44_8$, while allowing the vibration plates $42_1$–$42_8$ and the vibration transmitting rods $44_1$–$44_8$ to be bonded with ease to each other.

In summary, it will be seen that the present invention enhances the integration of a head by effectively arranging ink compressing chambers in an ink ejecting section, which constitute the head, and electrostrictive vibrators in an information signal supply section. Additionally, because the ink compressing chambers are defined below their associated nozzles, bubbles introduced into the chambers move toward the nozzles due to buoyancy to be readily discharged therefrom.

Various modifications will become possible for those skilled in the art after receiving the teachings of the present disclosure without departing from the scope thereof.

What is claimed is:

1. In a multi-nozzle head for an ink jet printer having a signal supply section for generating a displacement which corresponds to an information signal to be printed out, and an ink ejecting section for ejecting ink drops from a predetermined number of nozzles in response to the displacement, said ink ejecting section comprising:

(a) a flat head base; and (b) said predetermined number of ink compressing chambers formed in said head base to supply ink to the nozzles respectively, said ink compressing chambers being arranged such that the ink compressing chambers are divided into a plurality of groups and said groups are respectively positioned on a plurality of imaginary lines which are individually inclined at predetermined angle with respect to an intended direction of ejection of ink drops from the nozzles;

the ink ejecting section further comprising flat resilient vibration members each constituting part of a wall which closes any of the ink compressing chambers associated therewith, and vibrating in response to the displacement imparted from the signal supply section;

the signal supply section comprising (c) elongate flat vibration units in a number which is equal to the number of the ink compressing chambers, and (d) a support member for supporting said vibration units at one portion of the vibration units such that the other end of each of the vibration units coincides with a position of any of the ink compressing chambers associated with said vibration unit;

the support member supporting the vibration units such that the vibration units lie in a common plane and extend in two opposing directions;

each of the vibration units comprising an electrostrictive vibrator displacable in response to the information signal to be printed out, a vibration plate integral with said electrostrictive vibrator and vibrating in response to the displacement, said electrostrictive vibrator and vibration plate being spaced from and extending parallel to the support member, and a vibration transmitting rod for transmitting the vibration to any of the ink compressing chambers associated with the vibration unit.

2. A multi-nozzle head as claimed in claim 1, in which the ink compressing chambers are further arranged such that the ink compressing chambers are respectively located below the nozzles during operation.

3. A multi-nozzle head as claimed in claim 1, in which said predetermined angle lies in a range of 0–90 degrees.

4. A multi-nozzle head as claimed in claim 1, in which the head base in the ink ejecting section further comprises a plurality of ink supply passageways for supplying ink from a source of ink supply to the ink compressing chambers, and a plurality of ink delivery passageways for delivering compressed ink from the ink compressing chambers to the nozzles associated with the ink compressing chambers.

5. A multi-nozzle head as claimed in claim 1, in which the vibration transmitting rod is prism-shaped.

6. A multi-nozzle head as claimed in claim 1, in which the vibration transmitting rod is pyramid-shaped.

7. A multi-nozzle head as claimed in claim 1, in which the vibration transmitting rod is formed integrally with the other end of the vibration plate.

8. A multi-nozzle head as claimed in claim 7, in which the vibration transmitting rod is prism-shaped.

9. A multi-nozzle head as claimed in claim 7, in which the vibration transmitting rod is pyramid-shaped.

10. A multi-nozzle head as claimed in claim 1, in which the vibration plate of the vibration unit is formed at the other end with engaging means for engaging with the vibration transmitting rod.

11. A multi-nozzle head as claimed in claim 1, in which the ink jet printer is of an ink on-demand type.

12. A multi-nozzle head as claimed in claim 1, in which the vibration transmitting rod is provided integrally with the flat resilient vibration member of the ink ejecting section.

13. A multi-nozzle head as claimed in claim 12, in which the vibration transmitting rod is prism-shaped.

14. A multi-nozzle head as claimed in claim 12, in which the vibration transmitting rod is pyramid-shaped.

15. A multi-nozzle head as claimed in claim 12, in which the vibration plate of the vibration unit is formed at the other end with engaging means for engaging with the vibration transmitting rod.

* * * * *